United States Patent

[11] 3,629,510

[72] Inventors Frederick N. Anderson
Neptune;
Ralph L. Miller, Chatham, both of N.J.
[21] Appl. No. 880,018
[22] Filed Nov. 26, 1969
[45] Patented Dec. 21, 1971
[73] Assignee Bell Telephone Laboratories, Incorporated
Murray Hill, N.J.

[54] ERROR REDUCTION LOGIC NETWORK FOR HARMONIC MEASUREMENT SYSTEM
6 Claims, 5 Drawing Figs.

[52] U.S. Cl. .................................................. 179/1 SA
[51] Int. Cl. .................................................. G10l 1/02
[50] Field of Search ........................................ 179/1 SA,
15.55; 325/38

[56] References Cited
UNITED STATES PATENTS
| | | | |
|---|---|---|---|
| 3,378,641 | 4/1968 | Vargos .......................... | 279/15.55 |
| 3,496,465 | 2/1970 | Schroeder ..................... | 179/1 SA |
| 3,535,454 | 10/1970 | Miller ........................... | 179/1 SA |

*Primary Examiner*—Kathleen H. Claffy
*Assistant Examiner*—Jon Bradford Leaheey
*Attorneys*—R. J. Guenther and William L. Keefauver ABSTRACT: The fundamental period of a complex periodic signal may be determined by measuring the periods of individual harmonics of the periodic signal and finding their smallest common multiple. A useful display of harmonics and their submultiples is called a period histogram. Since the fundamental period in a period histogram is an integral multiple of a number of harmonics and is characterized by a maximum amplitude pulse, the time of occurrence of the first maximum pulse may be taken to represent the fundamental period of the complex periodic signal. However, because the largest peak of the histogram does not always correspond to the fundamental frequency of a wave, occasional errors in the indication of pitch may result. Such errors may be obviated by examining the pitch signal developed from a histogram measurement, applying logical tests to determine its acceptability and, if the indicated pitch is found to be unacceptable, by substituting a more acceptable value.

(PEAK DETECTOR)

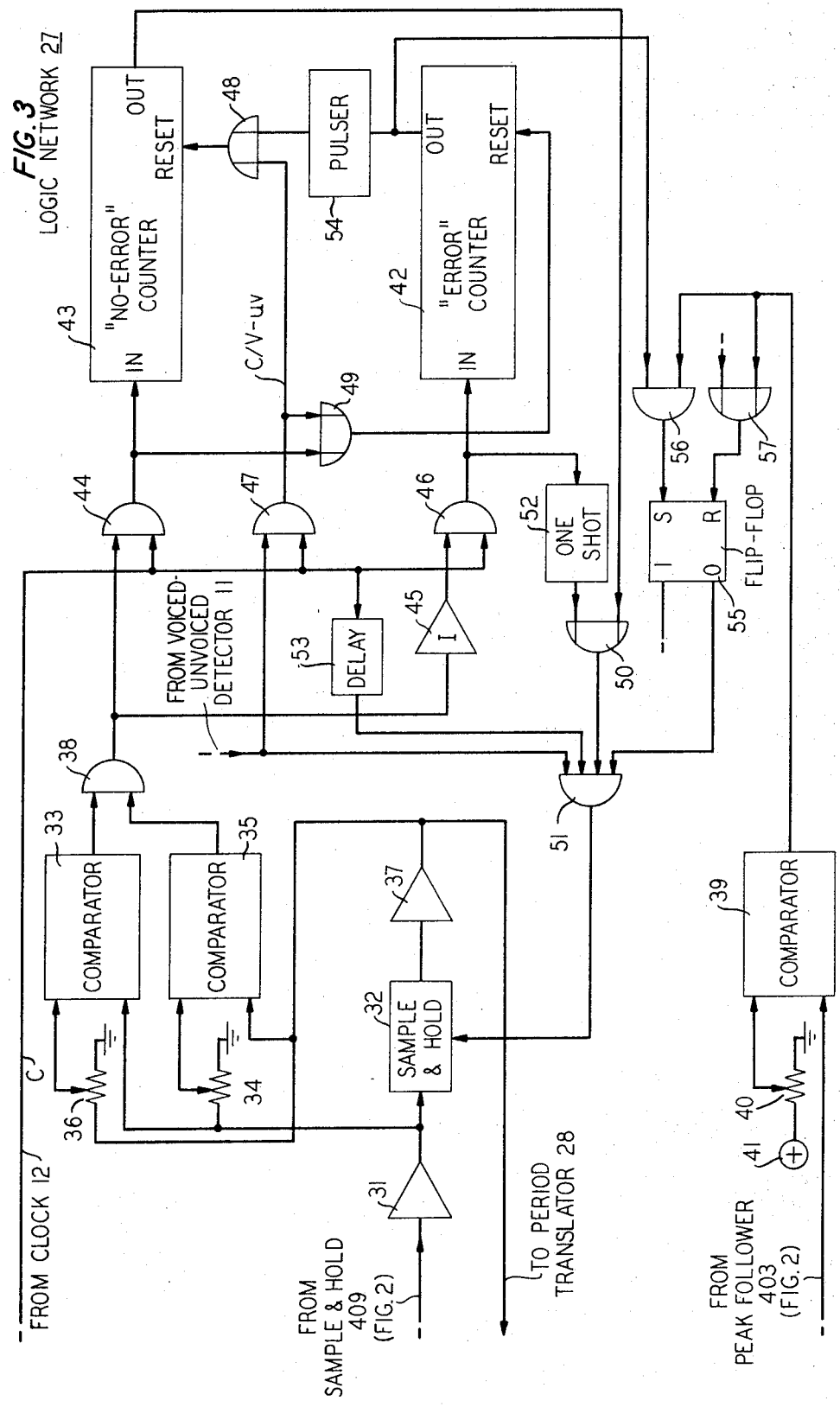

ERROR REDUCTION LOGIC NETWORK FOR HARMONIC MEASUREMENT SYSTEM

This invention relates to signal processing and, in particular, to the measurement of the fundamental frequency of a periodic signal such as a voiced speech signal.

BACKGROUND OF THE INVENTION

The proper functioning of many speech-processing devices and systems depends critically on an accurate measurement of the fundamental frequency of a periodic speech signal. Accurate measurement of fundamental frequency poses no insurmountable obstacle for signals of good signal-to-noise ratio at the fundamental frequency. If the fundamental frequency component is either contaminated by noise or is missing completely, as is sometimes the case with telephone speech signals from male speakers, it is often necessary to regenerate the fundamental frequency artificially or else to measure it in some indirect way.

One technique which has been found to be particularly satisfactory for determining the fundamental frequency of a speech signal is described by M. R. Schroeder in a paper entitled "Period Histogram and Product Spectrum: New Methods for Fundamental-Frequency Measurement," published in the *Journal of the Acoustical Society of America* for Apr. 1968, at page 829. Schroeder divides a complex periodic signal into subsignals occupying contiguous frequency bands. Periodically synchronized sequences of pulses are then generated with each sequence exhibiting a pulse spacing inversely proportional to the frequency of a corresponding one of the subsignals. By summing the resulting pulse sequence, a sequence of nonuniform amplitude pulses is produced. A display of the sequence is called a "period histogram." The amplitude of each pulse in the sequence depends on the total number of simultaneously generated pulses in the sequence; the greatest amplitude pulse is made up of the greatest number of submultiple signals. The time of occurrence of the first maximum amplitude histogram pulse therefore corresponds to the period of the fundamental frequency. Unfortunately, occasional errors in pitch result when using the period histogram technique of analysis because the largest peak of a period histogram does not always correspond to the fundamental frequency of a wave.

SUMMARY OF THE INVENTION

In accordance with this invention, errors in the determination of fundamental frequency of a voiced-speech signal are avoided by analyzing the pitch indication developed from a period histogram, by applying certain logical tests to determine the adequacy of the indication and, if the indication is not adequate, by determining the frequency and the magnitude of the error. Unacceptable pitch indications are thereupon replaced by a suitable substitute value, for example, by the last previous acceptable indication. Substitutions are allowed only for a selected number of intervals, and a new analysis is performed in the event that a number of unacceptable pulses are produced in sequence. Accordingly, isolated errors in pitch are eliminated and an appreciable improvement is achieved in the accuracy by which the fundamental pitch of a complex signal is measured.

This invention will be more fully understood from the following detailed description taken together with the drawings.

BRIEF DESCRIPTION OF THE Drawings

FIG. 3 is a schematic block diagram of a logic network, in accordance with the invention, which is suitable for use in the practice of the invention as illustrated in FIG. 1;

DETAILED DESCRIPTION

Figure 1:
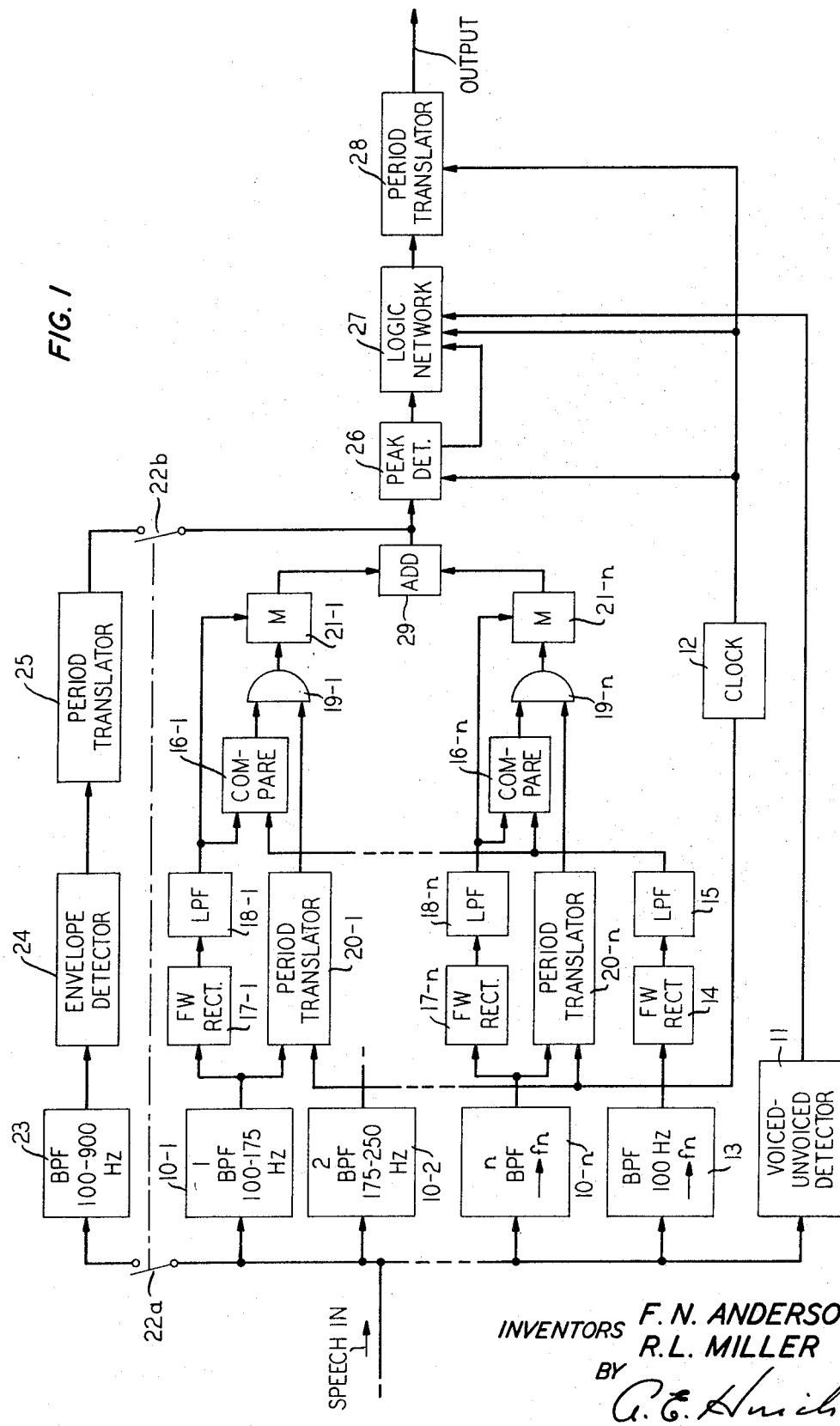
FIG. 1 is a schematic block diagram of a fundamental period detector including improvements according to this invention.

FIG. 1 illustrates in block schematic form a fundamental period detector which employs the error reduction techniques of the present invention. A complex periodic acoustic signal, such as a speech signal, is supplied to each of band-pass filters 10-1 through 10-n, band-pass filter 13, and to voiced-unvoiced detector 11. Band-pass filters 10 serve to divide the complex electrical signal into subsignals occupying adjacent contiguous frequency bands. Ideally, each filter is selected to separate out individual harmonics of the lowest desired fundamental frequency. In practice, a uniform set of ten 75 Hz. band-pass filters, beginning with a frequency of about 100 Hz. and extending to about 850 Hz., has been found to be satisfactory. In order to extend the range to include the fundamental of very low-pitched voices, an additional channel filter to cover the range of about 60 to 100 Hz. may be used.

The subsignal passed by each of filters 10 is analyzed by a corresponding one of period translators 20-1 through 20-n. Each period translator measures the period of the corresponding filter output signal, for example, by examining zero axis crossings, and uses the measure to control the period of a pulse generator linearly related to the period of the harmonic wave from the filter. Each translator thus produces a pulse sequence at a rate proportional to the frequency of the output signal from the corresponding filter. Each pulse sequence is periodically synchronized by pulses from clock 12 with the pulse sequences produced by all other translators. Thus, all pulse sequences are periodically restarted together. Details of the construction and operation of period translators 20, and indeed of all of the other elements of the fundamental frequency detector, are described in copending applications of M. R. Schroeder, Ser No. 639,733, filed May 19, 1967, now U.S. Pat. No. 3,496,465, granted Feb. 17, 1970, and R. L. Miller, Ser. No. 710,595, filed March 5, 1968 now U.S. Pat. No. 3,535,454, granted Oct. 20, 1970.

Pulse sequences from translators 20 are used to estimate the fundamental period of the complex periodic signal only if the subsignals from which they are derived exceed a prescribed threshold amplitude. Comparison networks 16-1 through 16-n, of well-known design, are used to make this determination. Rectifiers 17-1 through 17-n, together with low-pass filters 18-1 through 18-n, provide estimates of the amplitudes of the subsignals from filters 10-1 through 10-n for use in the comparison networks. These estimates are then compared with an estimate of overall signal amplitude. This estimate is derived from band-pass filter 13, rectifier 14, and low-pass filter 15. Filter 13 typically accommodates applied speech signals in the range from 100 Hz., i.e., the lowest range of band-pass filter 10-1, to frequency $F_n$, the highest frequency of band-pass filter 10-n. If the subsignal amplitude at one of comparators 16 exceeds the threshold amplitude, the comparison network emits an output signal which opens the corresponding one of AND-gates 19-1 through 19-n. In that event, the pulse sequence from the period translator 20, whose input signal exceeds the selected threshold, is passed through the corresponding AND-gate Multipliers 21-1 through 21-n weight the pulse sequences from the corresponding AND-gates 19 by the amplitude of the corresponding subsignal. Output signals from multipliers 21 are thereupon combined, for example, in adder 29, to produce a "period histogram."

Voiced-unvoiced detector 11, supplied with input signals, operates in well-known fashion to produce a signal indicative of the voicing characteristic of the applied signal. Any of the many detectors commonly used in vocoder apparatus or the like can be used to produce the required control signal for the practice of this invention. The voiced-unvoiced control signal is delivered from detector 11 to logic network 27.

Since it is sometimes difficult to distinguish a histogram pulse of maximum amplitude from other histogram pulses of slightly smaller amplitude, it is advantageous to derive an additional estimate of the fundamental period of the applied signal and to add the estimated fundamental frequency signal to the period histogram signal to weight the largest histogram summation in favor of the fundamental. As described in the copending Miller application, this estimate may conveniently be made by closing switch 22 to bridge the fundamental detector circuit by a tandem arrangement including band-pass filter 23, envelope detector 24, and period translator 25. Filter 23, typically has a range of 100 through 900 Hz. Envelope detector 24, in its simplest form, consists of a halfwave rectifier and a band-pass filter with a cutoff frequency in the range of about 70 to 140 Hz. Detector 24 produces an output signal with a fundamental frequency corresponding to the envelope of the signal supplied to filter 23. Period translator 25 serves to produce a sequence of output pulses with a pulse spacing proportional to the fundamental period of the input speech signal. This sequence of pulses is added to those produced at the output of adder 29 to weight the period histogram additionally in favor of the fundamental.

If the histogram pulses from the several channels have a well-defined harmonic relation, then at some point in time, corresponding to the fundamental period of the applied wave, a number of pulses will coincide and add together to give a maximum value. In effect, the several channels provide signals by which all possible combinations of wave period are produced for examination. Unfortunately, other harmonics of the applied wave are also produced and result in peak signals, though not as strong as those produced at the fundamental frequency. Examples of typical period histograms illustrating the peaks which occur at the fundamental and related harmonics are shown and described in the aforementioned Schroeder paper published in the *Journal of the Acoustical Society of America*. To obtain a measure of the fundamental period of the applied speech signal, it is thus necessary only to determine the position of the *first* major peak in the period histogram.

Figure 2:
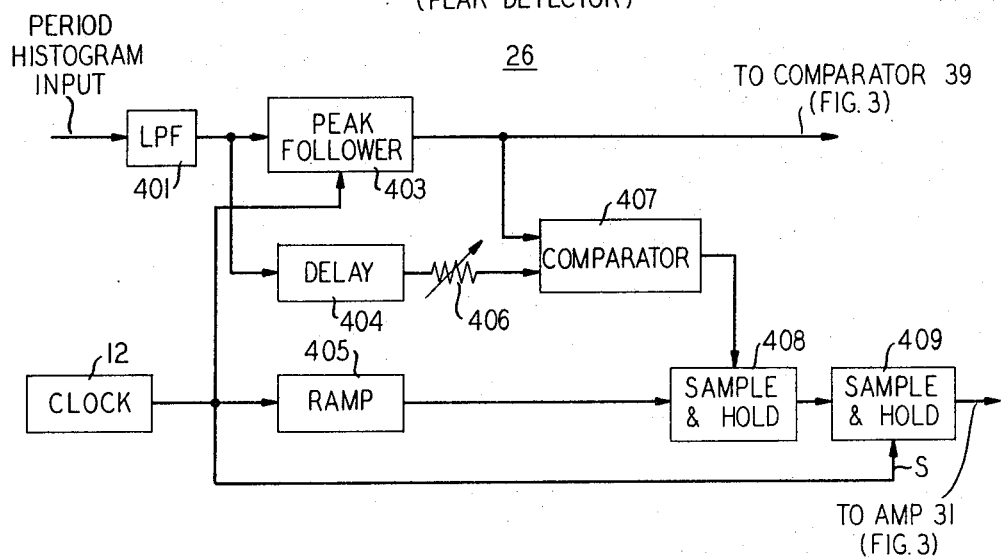
FIG. 2 is a schematic block diagram of a peak detecting network suitable for use in the apparatus of FIG. 1.

Accordingly, combined signals from adder 29 (and period translator 25, if used), are supplied to peak detector network 26 where the first major peak of the histogram is selected. A peak detector network suitable for this application is described in detail in the copending Miller patent application. A block diagram illustration of the detector described by Miller is shown in FIG. 2 of this application. Suffice it to say, that the period histogram input signal is supplied, by way of low-pass filter 401, to peak-follower 403 and to delay-element 404. Follower 403 produces an output voltage which follows the amplitude of applied histogram pulses and holds a voltage proportional to the highest detected pulse in the histogram. Follower 403 is reset periodically by pulses from clock 12. The value of the highest detected pulse is then compared in comparator network 407 with the value of each preceding pulse as supplied by delay 404 and as adjusted against a threshold by potentiometer 406. Thus, the last pulse produced at the output of comparator 407 represents the first major peak in the period histogram. The output of the comparator is in turn supplied to sample-and-hold network 408. A signal whose magnitude is proportional to the position of the first major peak in the period histogram is produced by allowing ramp 405 to run from zero at the time of a pulse from clock 12, and by sampling and holding the ramp signal value whenever comparator 407 produces a pulse. Each new peak in the period histogram yields a pulse output at comparator 407 which updates the magnitude of the signal stored by sample-and-hold unit 408. Unit 409 holds the value obtained in unit 408 during the clock interval.

If all harmonics in the histogram are properly ordered in time according to amplitude, the strongest peak may be taken to represent the fundamental period of the applied speech wave. However, it has been found that during voiced segments of speech, the largest peak of the period histogram does not always correspond to the fundamental period. The indicated output of peak detector 26 may thus be in error; it may not truly denote the fundamental period or pitch of the input signal. The errors which occur are usually caused by displacements of the largest peak in the histogram at multiples or submultiples of the fundamental period.

Isolated pitch errors are removed, in accordance with this invention by delivering signals from detector 26, which represent a measure of signal period, to logic network 27. Network 27, as described hereinafter, particularly with reference to FIGS. 3 and 4, inhibits single and double errors of pitch, i.e., one and two sample periods of incorrect voltage, which may occur during a voiced segment of speech. Corrected pitch signals are then delivered to period translator 28 wherein discontinuities in the signal are smoothed and the signal is prepared for delivery to an output channel. Typically, translator 28 filters the supplied signal and then controls the frequency of a voltage-controlled oscillator with the smoothed signal. A pulse train is derived from the voltage-controlled oscillator at the fundamental frequency of the input signal. This pulse train may then be used as a so-called "pitch signal" in the synthesis of a replica of the input signal, for example, from coded control signals.

If the pitch extracting circuit heretofore described were confined to use with high-quality speech, very few errors would be produced and those that were would be extremely minor and rarely noticed in output speech produced using the indicated pitch. However, poor-quality speech, noisy speech, and very low-pitched talkers have speech characteristics which are hard to analyze. Errors in the determination of pitch for this sort of signal however usually occur as single sample errors. The main reason for this is that they are usually caused by fast changes in the speech waves. Because of this, errors that do occur are not maintained for a very long interval.

In accordance with this invention, errors that do occur are accounted for and corrected so as to produce an indication of pitch that closely follows the pitch of the applied signal notwithstanding its individual characteristics. In accordance with the invention, a criterion is established by which a selected number of successive values of indicated pitch must deviate by less than some small value, representing the maximum expected inflection change in a sample period, before an output signal is produced. In practice, it has been found effective to base the decision on four or more successive values. Signals from detector 26 (sample-and-hold network 409 of FIG. 2) are thus examined to determine whether or not the period signals they denote are really peaks that exceed the prescribed threshold. If they are, a further examination is made to ascertain whether a detected peak represents the first, largest peak of the histogram. If a detected error is found, the voltage level which represents the first major peak in the period histogram is discarded and the last previous voltage level is used to specify the current indication of pitch.

FIG. 3 illustrates the manner by which network 27 carries out the logical analysis of period histogram signals to inhibit pitch errors.

Initially, the apparatus of FIG. 3 examines incoming signals from peak detector 26 (network 409 in FIG. 2) to determine whether voltage deviations between successive signal segments are greater or less than a prescribed amount. Signals from sample-and-hold 409 are thus supplied by way of isolation amplifier 31 to sample-and-hold network 32. Samples of the applied signal are applied to comparator network 33 and by way of potentiometer 34 to comparator 35. Samples developed in unit 32 are held for a prescribed interval, equal to a sampling interval, and supplied by way of isolation amplifier 37 directly to comparator 35 and by way of potentiometer 36 to comparator 33. This arrangement permits a previous sample, held in network 32, to be compared with a new sample to determine whether the voltage deviation in signals from sample-and-hold 409 is greater than a set margin. The circuit is complicated by the fact that the deviation may be in either the positive or negative direction. That is, if the deviation is caused by the largest peak in the period histogram at some time in advance of the expected peak representative of the fundamental period, i.e., at ½ $P_0$, where $P_0$ represents the time of occurrence of the fundamental, the deviation will be in the negative direction. For all other errors, i.e., peaks occurring after $P_0$, e.g., at $2P_0$, $3P_0$, and so on, the deviation will be in the positive direction. Thus, when the output of sample-and-hold unit 32 is more positive than the output of sample-and-hold unit 32 is more positive than the output of sample-and-hold 409, but the deviation is less than the margin established by potentiometers 34 and 36, the outputs of both comparators 33 and 35 are positive, and may be defined as a logical "1." Likewise, the output of both comparators is a logical "1" when the input to sample-and-hold 32 is more positive but within the limits of the margin. When the deviation exceeds the margin in the positive direction, comparator 33 produces a logical "0." Comparator 35 does not detect the change and still yields a logical "1." When the deviation exceeds the margin in the negative direction, comparator 35 detects it and produces a logical "0." In this case, comparator 33 does not detect the change and continues to yield a logical "1." When no error is detected, i.e., when the deviation between samples is less than margin, both comparators produce a "1" signal and the output of AND-gate 38 is a logical "1." Should either comparator switch to the "0" state, indicating an error, the output of AND-gate 38 becomes a "0."

Figure 5:
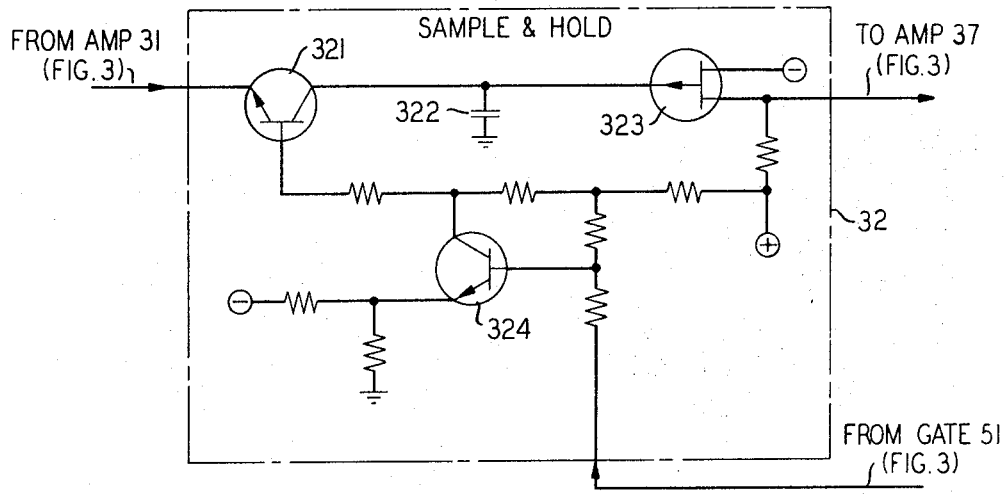
FIG. 5 illustrates a sample-and-hold network suitable for use in the practice of the invention.

Sample-and-hold network 32 may take any desired structural form. One suitable arrangement is illustrated in FIG. 5. Signals from isolation amplifier 31 are applied at a low impedance to the collector of transistor gate 321. When actuated, the transistor gate supplies the applied signal to storage capacitor 322 and to the input of impedance conversion transistor 323, typically an FET device. The output signal at a high impedance from transistor 323 is delivered to the input of isolation amplifier 37. Gate transistor 321 is controlled by binary signals delivered from AND-gate 51 (FIG. 3) to the base of transistor 324. When a "0" pulse is present, transistor 324 conducts to open transistor gate 321, i.e., to render it conducting. With a "1" signal supplied from gate 51, transistor 324 is cutoff and transistor gate 321 is opened, i.e., sample-and-hold circuit 32 is inhibited. In this event, the signal stored on capacitor 322, being the last sampled signal, is delivered continuously to the input of amplifier 37. Because of the low impedance characteristic of the input source, capacitor 322 follows the input signal level during sampling intervals.

To guard against errors caused by low-level "peaks," signals from peak follower 403 (FIG. 2) are supplied to comparator 39 (FIG. 3) and are used to establish a period histogram norm. The highest peak in the supplied period histogram is compared in unit 39 to a threshold voltage established by potentiometer 40 supplied from voltage source 41. When the level of the period histogram drops below the level determined by potentiometer 40, comparator 39 switches to a logical "1." Thus, low level, inaccurate peaks provide a warning that bad data may be present so that evasive action can be taken.

Having detected certain errors in the incoming histogram data, it is then necessary to decide whether the "detected error" is actually an error that must be corrected. Accordingly, the objective of the logical operation is to inhibit single and double errors of pitch (one or two sample periods of incorrect voltage level) which occur during a voiced segment of speech. No attempt is made, however, to correct errors at the start of a voiced speech interval. The logical rules by which this decision is made are listed in order below. The six rules must be followed in order.

1. No sample pulses are developed during unvoiced periods.
2. Error counter 42 and no-error counter 43 are initialized to "0," i.e. reset, during unvoiced periods.
3. A minimum number clock periods $c$, e.g., four clock periods without detected errors, i.e., a count of four on no-error counter 43 must have occurred before the presently supplied sample is inhibited.
4. Single and double errors are inhibited.
5. The error count of unit 42 is returned to "0" after one clock period without error.
6. With three errors in a row, no-error counter 43 is reset and one of the following actions is taken:
   a. A sample-and-hold pulse from unit 32 is generated when the highest peak in the period histogram exceeds a set margin.
   b. The sample-and-hold pulse from unit 32 is inhibited, thus retaining the previously derived sample, when the highest peak in the period histogram is less than a set margin. The sample-and-hold pulse continues to be inhibited until the period histogram level rises.

Logical Rule 1 prevents the production of sample pulses during unvoiced intervals. Since the period histogram provides little or no meaningful data during unvoiced intervals, a signal supplied to the logic network may not be accurate. Allowing sample pulses to be developed at this time would only result in producing random voltage levels and erratic operation. On the other hand, by not allowing sample pulses to be developed would result in the last pitch value to be held at a value close to where it should be for the next voiced interval.

Counters 42 and 43 must be initialized to "0" during unvoiced intervals (Rule 2) since four clock periods without detected errors, not necessarily in succession, could exist just prior to a voiced segment of speech. Rule 3 would thus be satisfied during an unvoiced segment of speech. The correct clock periods at the beginning of a voiced segment would then be termed incorrect due to a faulty precedent set during the unvoiced segment. To avoid this incorrect precedent, counters 42 and 43 are set to "0" during unvoiced segments of speech. Rule 3 additionally ensures that the logic circuit has a correct input at the start of a voiced period by insisting on four clock periods without errors before a sample will be inhibited. During the start of a voiced period, signals in the period histogram essentially track the input. Any errors existing at the start of a voiced period, therefore, would not be corrected. Rule 3 also applies to the middle of a voiced period when no-error counter 43 is set to "0," because of the detection of three or more errors in a row (see Rule 6).

Figure 4:
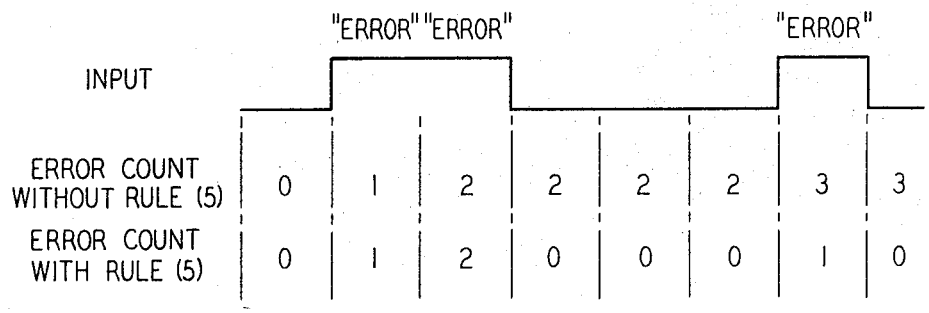
FIG. 4 illustrates graphically a typical peak picking logic input, useful in explaining the invention.

Rules 4 and 5 are very closely related, with Rule 4 representing the ultimate goal of logic network 27. FIG. 4 represents a typical peak picking logic input and illustrates why Rule 5 is important. As shown, the error count without Rule 5 would continue to three and thus satisfy Rule 6 when actually no more than two isolated errors in a row existed. The errors counted by unit 42 with Rule 5 in play does not count past two, since a clock period without an error resets it to zero. Isolated errors of one or two in a row are removed by implementing Rule 4.

When three detected errors in a row are found, there may well be something wrong with the input signal. Perhaps the input amplitude trailed off or the input period suddenly jumped to the second harmonic. In either case, three or more errors in a row will be detected. If the errors are caused by the decaying of the input signal amplitude, the logic network should hold the last correct input. On the other hand, if the errors were caused by a shift of input level, indicating a shift to a new harmonic, the logic network should allow these new input signals to pass to the output. Rule 6 will cause one of the two actions described to be taken. Also, the network will reset no-error counter 43 to zero thus to return to the logic of Rule 3.

The logical rules just described are carried out in the remaining circuit illustrated in FIG. 3. Error counter 42 and no-error counter 43 keep track, respectively, of potential errors determined and indicated by the output of AND-gate 38. Although conventional counter apparatus may be used, it has been found advantageous in practice to employ shift registers to perform the counting operation in order to avoid considerable additional circuit complexity, particularly in the required amount of output gating. In operation, a logical "1" supplied from AND-gate 38 is passed at clock intervals $c$ by AND-gate 44 to the input of no-error counter 43 causing it to shift a "1" signal into storage. A logical "0" from AND-gate 38 is delivered to inverting amplifier 45 and, at clock times, is supplied by AND-gate 46 as a logical "1" to the input of error counter 42, causing it to store a logical "1." Both registers are reset by a clocked/voiced-unvoiced signal ($c/v-uv$) during an unvoiced condition. This action is achieved by supplying voiced-unvoiced signals from detector 11 (FIG. 1) to one input of AND-gate 47 and clock pulses from clock 12 (FIG. 1) to the other input of gate 47. The logical "1" signal produced by the gate is passed by way of OR-gate 48 to reset no-error counter 43 and by way of OR-gate 49 to reset error counter 42. Both registers thus start with a "0" count at the beginning of the next voiced interval.

The output of no-error counter 43 is delivered as an input to OR-gate 50. Until a count of four has been attained, the output of register 43 is a logical "0." This logical "0" at the input to OR-gate 50 is delivered to AND-gate 51 and serves to prevent AND-gate 51 from responding to other inputs. Therefore, sample-and-hold unit 32 receives a "0" signal from gate 51 and is uninhibited. It therefore continues to deliver new pulses regardless of the levels of other pulses in the logic system. Until a count of four has been reached, therefore, sample-and-hold unit 32 continues to deliver samples and the input period histogram from detector 26 is tracked whether or not it contains an error. After a count of four has been achieved in no-error counter 43, its output becomes logical "1" and it has no further effect on the action of gate 51. Rule 3 is thus satisfied.

After a four-count in counter 43 has been reached, detected errors, indicated by a "1" signal issuing from AND-gate 38, and applied by way of gate 46 to the input of one-shot 52, are used to inhibit the action of sample-and-hold unit 32 by way of OR-gate 50. The one-shot output is effective to block AND-gate 51 so that sample-and-hold network 32 cannot deliver a new sample. Instead, it continues to deliver the last-held sample. Isolated errors of one or two periods are thus not allowed to be sampled and are effectively removed from the train of output signals.

To allow sufficient time for sample-and-hold network 32 to operate reliably at a time after all decisions have been made, pulses from clock 12 are passed through delay element 53 and supplied as a second input to AND-gate 51. This pulse controls the width and placement of the sample pulse. It occurs at a sufficient time after clock pulse $c$ to allow the logic circuits time to perform their function. To prevent samples from being taken during unvoiced periods, as prescribed by Rule 1, voiced-unvoiced signals from detector 11 are supplied as a third input to AND-gate 51.

Rule 6 above is implemented by the fourth input to AND-gate 51, as follows. When three detected errors in a row have been counted (error counter 42 is reset at every detected no-error count via OR-gate 49 from AND-gate 44), no-error counter 43 is reset to "0" by a signal issuing from error counter 42 delivered to pulser 54. Pulser 54 converts the applied signal into an appropriate pulse for penetrating OR-gate 48 to reset counter 43. Whether a sample-and-hold pulse is produced at this time depends upon the level of the highest peak in the period histogram. When this level falls below a set margin, established in comparator 39, and three errors in a row have been detected, flip-flop 55 is energized by the presence of "1" signals from comparator 39, and a "1" signal from counter 42 at the input of AND-gate 56. Flip-flop 55 switches to the "1" state to supply a "0" signal to the fourth input of AND-gate 51, thus to inhibit further sample-and-hold operations. Flip-flop 55 is reset upon an increased level of the period histogram by virtue of a "1" signal from comparator 39 delivered to the flip-flop reset input through OR-gate 57.

Logic network 27 thus serves to seek out errors in the identification of a maximum peak in a period histogram and to hold the previous value as a substitute in the event of a detected error. Although a number of errors have been found to occur at the start of a voiced interval, these start-up errors usually occur as single errors and are not removed by the action of logic network 27 because a point of reference has not yet been established. Nevertheless, virtually all other errors are eliminated and the accuracy in identifying the fundamental period of a voiced speech signal is greatly improved.

Although the principles of the invention have been described with reference to one form of logic circuit implementation, it is obvious that other arrangements of elements may be adapted to carry out the described operations. Moreover, numerous variations and modifications will occur to those skilled in the art.

What is claimed is:

1. Apparatus for determining the pitch of a speech signal, which comprises, means supplied with a signal representative of histograms of successive periods of a speech signal for developing a control signal as an indication of the pitch of said speech signal from the first major peak in each of said histograms, means for inhibiting the use of said control signal whenever said control signal deviates from a preestablished norm by a prescribed amount, and means for continuing the use of a previously developed control signal as an indication of the pitch of said applied speech signal until a new control signal is developed.

2. Apparatus for determining the fundamental frequency of a speech signal, which comprises, means supplied with a speech signal for developing a first signal representative of a period histogram of successive voiced periods of said speech signal, in which the fundamental period of said signal is indicated by the first major summation of common submultiples of harmonics of said speech signal, means for developing a second signal representative of the time of occurrence of major peaks in each period of said first signal, and means applying logical tests to said second signal for selecting one of said second signals as an indication of the pitch of said speech signal.

3. Apparatus as defined in claim 2, wherein, said means for selecting one of said second signals includes, means for inhibiting the selection of one of said second signals unless a selected number of successive values of said second signal deviates from the maximum expected inflection change in a sample period by a prescribed value.

4. Apparatus as defined in claim 2, wherein, said logical tests include means for assuring the selection of the first major peak in each period of said first signal that exceeds a prescribed threshold.

5. Apparatus for determining the fundamental frequency of a speech signal, which comprises, means supplied with a speech signal for developing a first signal representative of a period histogram of successive voiced periods of said speech signal, in which the fundamental period of said signal is indicated by the largest summation of common submultiples of harmonics of said speech signal, means for developing a second signal representative of the time of occurrence of major peaks in each period of said first signal, means responsive to said second signal for selecting the first of said peaks in each period of said first signal that exceeds a prescribed threshold as an indication of the pitch of said speech signal, and means for continuing the previous indication of pitch until a period signal that exceeds said threshold is selected.

6. Apparatus for determining the fundamental frequency of a complex periodic signal which comprises:

means for developing a plurality of subsignals representative, respectively, of the frequencies of detectable harmonic components of a complex periodic signal, means for dividing each of said subsignals by a plurality of integer values to produce a multiplicity of quotient signals, means for determining quotient signals common to all of said subsignals, means for utilizing the time of occurrence of a selected quotient signal whose amplitude exceeds a prescribed threshold as an indication of the fundamental period of said complex wave, means operative in the absence of a quotient signal above said threshold for substituting the time of occurrence of the last previous quotient signal that exceeded said threshold as said period indication, and means for inhibiting the development of said subsignals during periods of said complex signal determined to represent unvoiced speech intervals.